No. 700,925. Patented May 27, 1902.
G. HEURTEAUX.
APPARATUS FOR RINSING BOTTLES.
(Application filed Dec. 16, 1901.)
(No Model.) 11 Sheets—Sheet 1.

FIG. 1

Witnesses: Inventor:
Georges Heurteaux
By H. B. Willson & Co.
Attorneys

FIG. 2

No. 700,925. Patented May 27, 1902.
G. HEURTEAUX.
APPARATUS FOR RINSING BOTTLES.
(Application filed Dec. 16, 1901.)

(No Model.) 11 Sheets—Sheet 6.

FIG _ 6

Witnesses

Inventor:
Georges Heurteaux
By H. B. Willson & Co
Attorneys No. 700,925. Patented May 27, 1902.
G. HEURTEAUX.
APPARATUS FOR RINSING BOTTLES.
(Application filed Dec. 16, 1901.)
(No Model.) 11 Sheets—Sheet 7.

FIG. 7

No. 700,925. Patented May 27, 1902.
G. HEURTEAUX.
APPARATUS FOR RINSING BOTTLES.
(Application filed Dec. 16, 1901.)
(No Model.) 11 Sheets—Sheet 8.

Witnesses: Inventor:
Georges Heurteaux
By Attorneys

No. 700,925. Patented May 27, 1902.
G. HEURTEAUX.
APPARATUS FOR RINSING BOTTLES.
(Application filed Dec. 16, 1901.)
(No Model.)
11 Sheets—Sheet 9.

Witnesses:
Inventor:
Georges Heurteaux
By H. B. Willson & Co
Attorneys

No. 700,925. Patented May 27, 1902.
G. HEURTEAUX.
APPARATUS FOR RINSING BOTTLES.
(Application filed Dec. 16, 1901.)
(No Model.) 11 Sheets—Sheet 10.

FIG. 14

No. 700,925. Patented May 27, 1902.
G. HEURTEAUX.
APPARATUS FOR RINSING BOTTLES.
(Application filed Dec. 16, 1901.)
(No Model.) 11 Sheets—Sheet 11.

FIG. 15

UNITED STATES PATENT OFFICE.

GEORGES HEURTEAUX, OF PARIS, FRANCE.

APPARATUS FOR RINSING BOTTLES.

SPECIFICATION forming part of Letters Patent No. 700,925, dated May 27, 1902.

Application filed December 16, 1901. Serial No. 86,104. (No model.)

*To all whom it may concern:*

Be it known that I, GEORGES HEURTEAUX, engineer, a citizen of the Republic of France, residing at 100 Boulevard Richard Lenoir, Paris, in the Republic of France, have invented certain new and useful Improvements in Apparatus for Rinsing Bottles, of which the following is a specification.

My invention relates to a rotary apparatus for rinsing bottles automatically, a great number at a time, and both quickly and effectually.

In this machine the charging and discharging of the bottles, the brushing of the bottles, and the rinsing of the bottles by means of jets of water under pressure are successively done at distinct points, to which the bottles, located in a case of pigeonholes the neck downward, are carried in continuous order by a frame having an intermittent rotary motion.

In the accompanying drawings, which show one form of my bottle-rinsing apparatus.

Figure 2:
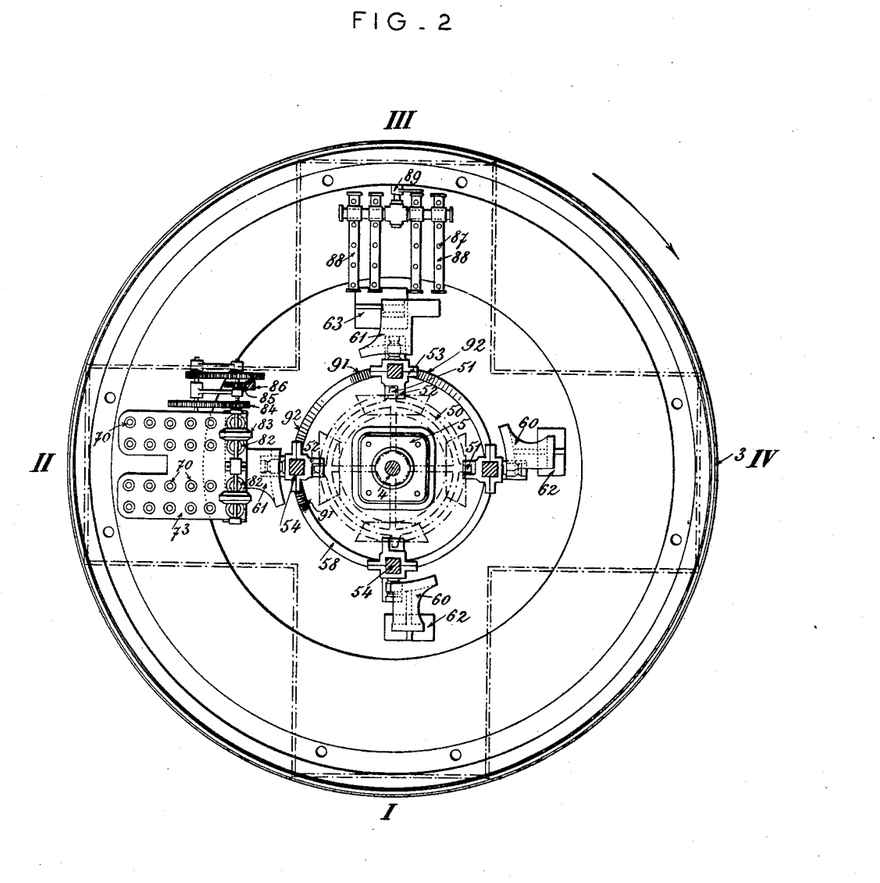
Fig. 2 is a plan view of the same on the line A B of Fig. 1.

The said apparatus comprises a rotary frame mounted by the medium of spring-supports 1 on rollers 2, resting on a circular rail 3, so that the said frame can rotate around a vertical driving-shaft 4. The latter rests on a step-bearing 5 and is operated at its upper part by a belt, gearing, or otherwise, so as to rotate continuously in the direction of the arrow in Fig. 2. The rotary frame comprises four like parts or compartments arranged at right angles, each of the said parts being formed by an upper framing 6, a lower framing 7, standards 8, located at the outer angles or corners, and standards 9, located at the inner angles or corners. The framings 6 and 7, rigidly connected together, form at the center collars 10 and 11, which rotate freely around the shaft 4. In each part of the frame are fixed to the framings 6 and 7 vertical pillars 12, on which can slide an upwardly and downwardly movable bed 13, which is also guided by means of vertical rods 14, integral with the bed and which slide freely through apertures in the framing 6, and of a cross-piece 15, which connects the lower ends of the standards 8. To the said bed are yieldingly hung a framing 16 and a plate 17, vertically movable along the guide-rods 14 and 19, fixed on the bed 13. The framing 16 is supported by springs 20, which rest on rings 21, fixed to the rods 14 and 19. The plate 17 is supported in the same manner by springs 22, which rest on rings 23, fixed to the rods 14 and 19. In the uppermost position of the bed 13 and of the rods 14 and 19 projections 24, formed on the framing 16, come against buffing parts 25, integral with the frame of the machine, so that this framing cannot rise any higher, notwithstanding the compression or tension of the springs 20. Likewise the upward movement of the plate 17 is limited by projections 26, which come against the buffing parts 27.

The framing 16 is recessed and open in the front, so as to present rectangular recesses 28 to receive the cases of pigeonholes 29 for the bottles. The edges of the said recesses form slideways 30, on which can slide and rest lugs 31, fixed to the said cases.

The plate 17 is provided with a certain number of apertures 32, on which are located cups 33, serving as seats to receive the necks of the bottles. The said cups are capable of rotating, preferably, on ball-bearings 34.

Figure 12:
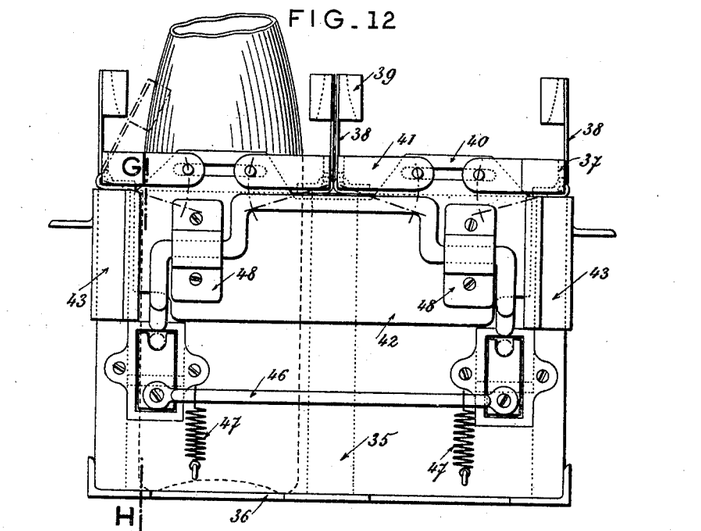
Fig. 12 is an elevation of a reversible pigeonhole-case for bottles.
Figure 13:
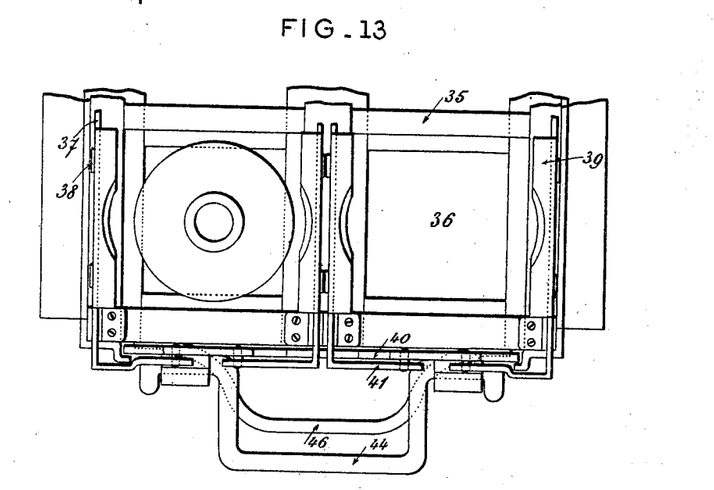
Fig. 13 is a top plan view of the same.
Figure 14:
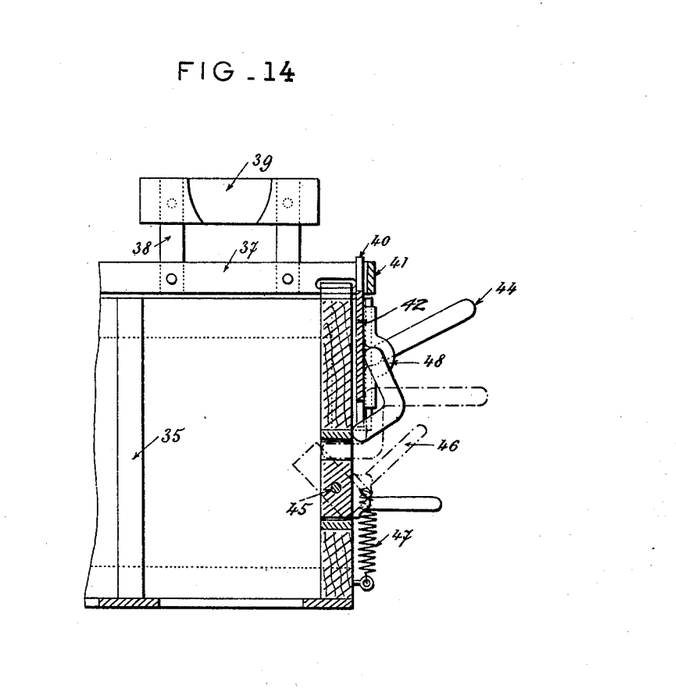
Fig. 14 is a longitudinal section of the same on line G H of Fig. 12.

Each bottle-case 29 is divided by partitions 35, which separate the bottles from each other, thus forming compartments at the bottom of which is a large aperture 36. In the case are arranged longitudinal bars 37, provided with spring-blades 38, carrying clips or pincers 39. The said bars, journaled in yokes 40, are operated simultaneously by means of slidable plates 42, which are guided vertically by lugs 43, so that all the branches or jaws of the clips or pincers can be pressed down together onto the necks of the bottles or moved off the same. The jaws can thus be closed by moving down the plates 42 by means of the handles 44 of the latter, the said handles being pivoted in yokes 48 on the plates 42 and so arranged as to be locked in the clamping position by dogs or pawls 45. The said dogs are connected together by a rod 46, subjected to the action of springs 47, which thus hold the dogs in the closed position. To move the jaws of the clips or pincers 39 from the necks of the bottles, the rods 46 are drawn outward in order to rock the said dogs 45. Then the plates 42 are moved upward by means of the handles 44, so that the cranks 41, the bar 37, and the clips or pincers 39 are caused to rock in releasing the bottles. When the clips or pincers are locked in the clamping position, the bottle-cases can be turned upside down without causing the bottles to fall.

The mechanism serving to operate the rotary frame comprises a wheel 50, fixed to the shaft 4 and provided with four teeth 51, located at right angles. In the path of these teeth can come operating-pins 52, carried by the frame and serving to carry the latter around the shaft 4, when they are met by the said teeth 51. The pins 52 are integral with slides 53, vertically movable on square rods 54, each of which passes freely through the framing 7 and a collar 55, carried by a part 56, connected to the said framing. The lower part of the rod 54 is provided with a roller 57, which rests on a fixed circular rail 58. Each of the slides 53 has a tendency to be drawn upward by springs 59, attached to the collar 55—that is to say, to the rotary frame—so that the pins 52 have a tendency to be held in contact with the teeth 51.

Figure 3:
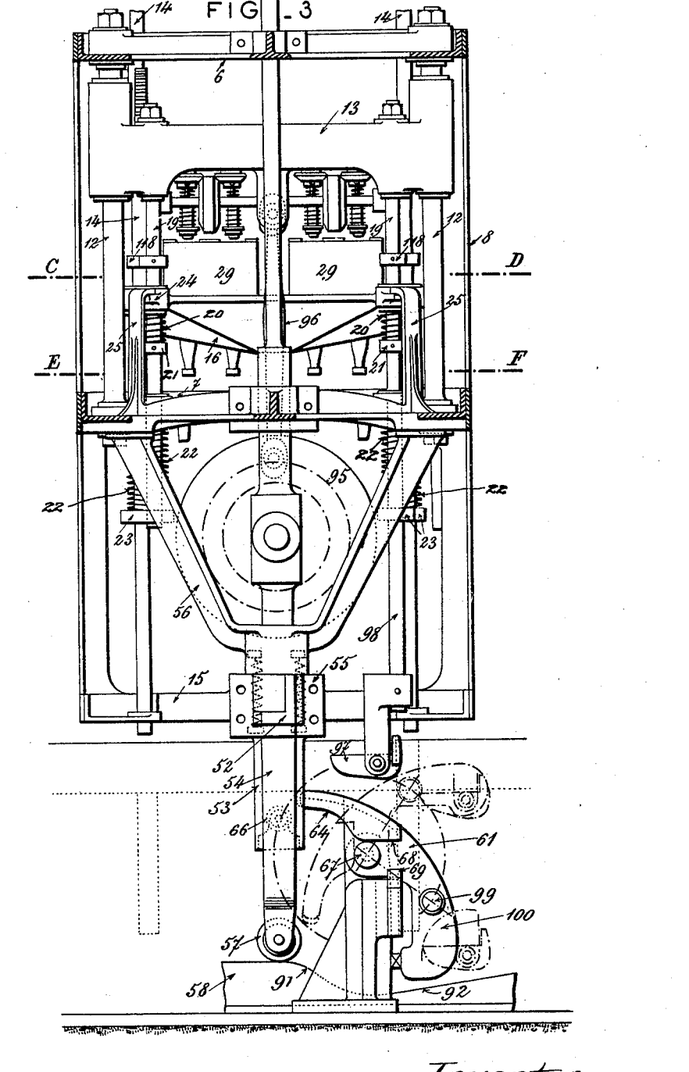
Fig. 3 is a part elevation of the apparatus as seen from within, the rotary frame being nearly arrived at one of its stopping positions.
Figure 4:
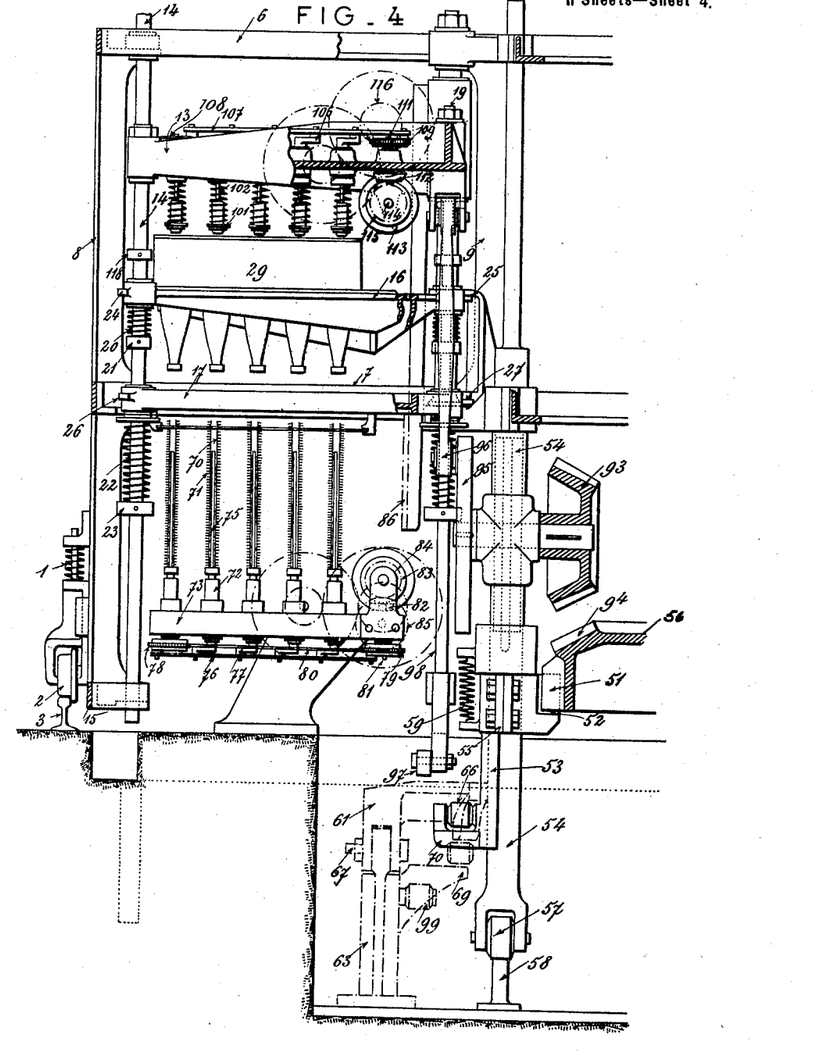
Fig. 4 is a side view corresponding to Fig. 3.
Figure 5:
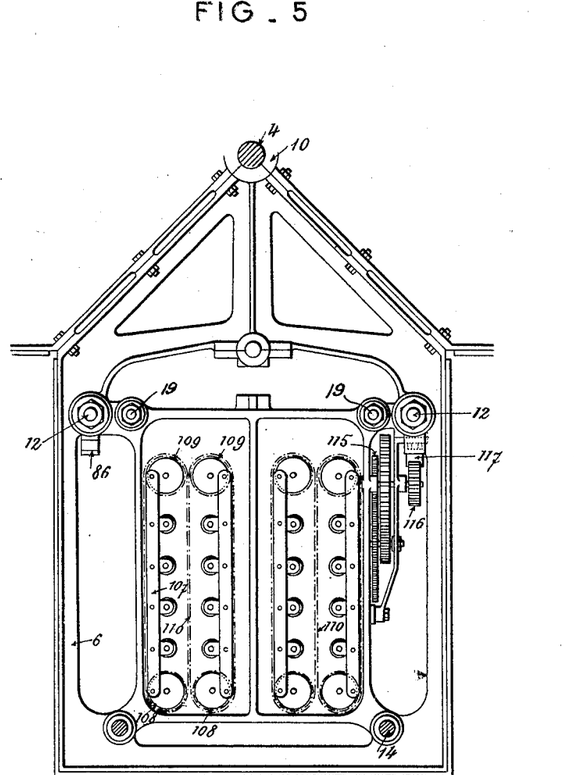
Fig. 5 is a part plan view of the top of the apparatus, showing the rotary frame and an upper platform or bed.
Figure 6:
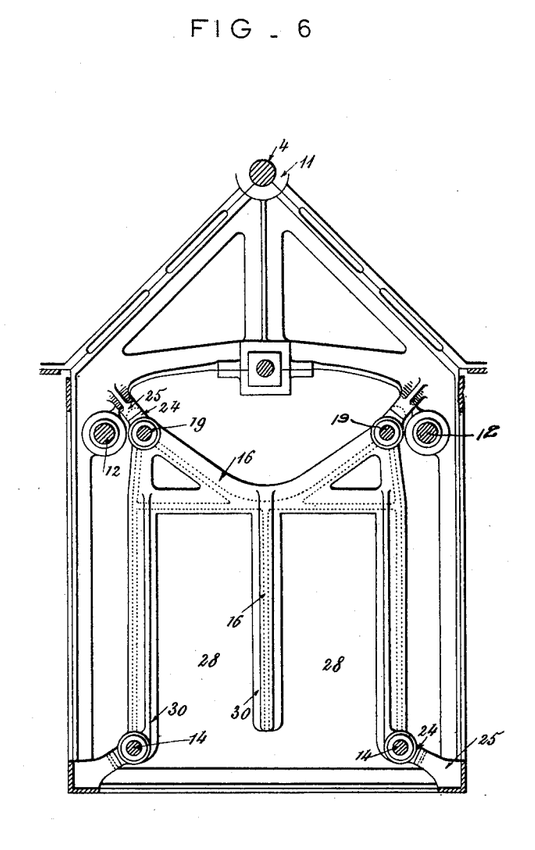
Figs. 6 and 7 are horizontal sections on the lines C D and E F, respectively, of Fig. 3.
Figure 7:
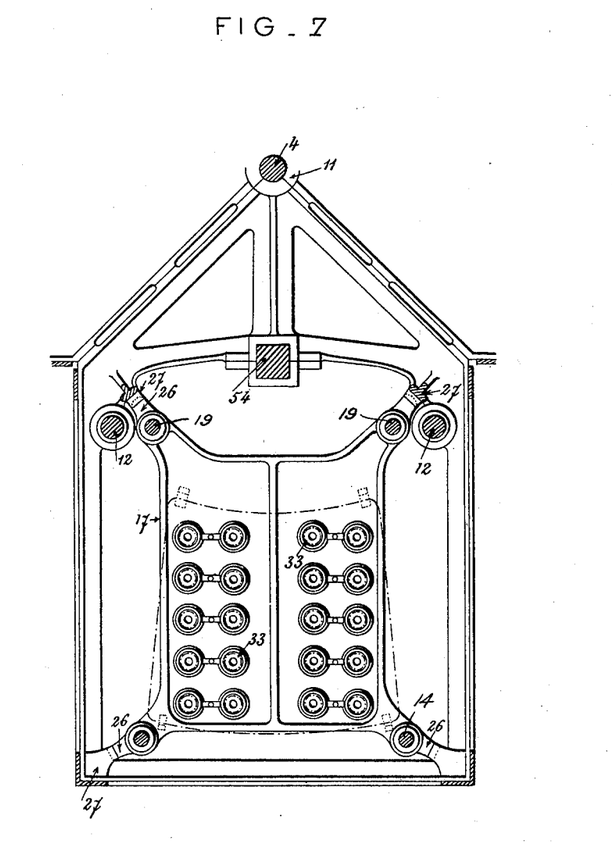
Figure 8:
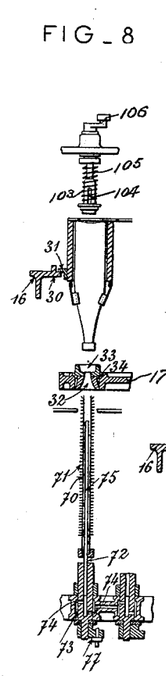
Figs. 8 and 9 show two positions of the bottles relatively to the bottle-brushes.
Figures 9, 10, 11:
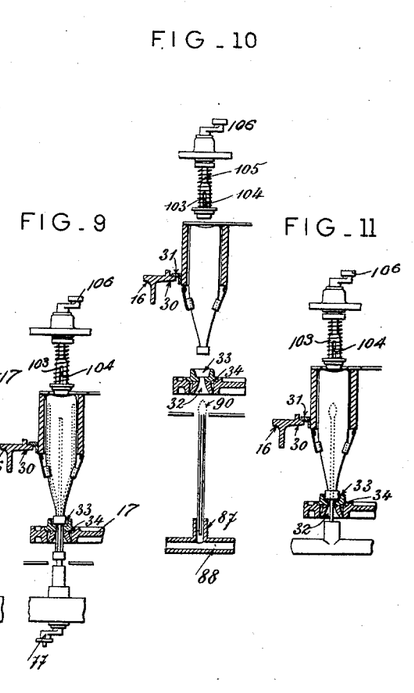
Figs. 10 and 11 show two positions of the bottles relatively to the ejectors.

In order to stop intermittently the rotary frame, cams 60 61 are so arranged on fixed supports 62 63 as to cause the slides 53 to move downward and separate consequently the pins 52 from the teeth 51. Two cams 60 are fixed and present an inclined path 64, which suddenly rises, as at 65, so that a roller 66, carried by each slide 53 and coming into the path 64, is moved gradually downward at first in operating the separation of the pins 52, the said roller being capable of running up the steep face 65 in bringing the said pins again into contact with the teeth 51. The two other cams 61 have also an inclined face 64 to bring the pins 52 into contact; but instead of being fixed they are each mounted to rock on a fixed spindle 67, so that they can be rocked, as shown by Fig. 3, to cause the roller 66 to move suddenly upward along the face 68, turned up vertically. The cams 61 are automatically rocked, as hereinafter described. The supports 63 of the cams 61 are also provided with fixed buffing parts 69 so arranged as to be met by the heels 70 of the slides 53 when the latter are lowered to prevent the rotary frame from turning any farther, while allowing the said heels to be released above them when the slides are moved up to allow the rotary frame to turn again.

The system of cams 60 61 and buffing parts 69, in combination with the slides 53 and pins 52, has the result of causing to stop each of the four compartments of the rotary frame successively at the four different points I II III IV. At the points I and IV are effected, respectively, the charging of the cases of bottles 29 onto the framing 16 and the discharging of the rinsed bottles. These two points or stations correspond to the fixed cams 60. The brushing and rinsing operations are effected at the points II and III, which correspond to the rocking cams 61. At point II each bottle-brush is composed of spring-blades 70, provided with bristles 71 and having a tendency to separate from each other at the top, while being fixed at the bottom to a hollow shaft 72, journaled in a fixed part 73 of the rotary frame of the apparatus. The said fixed part 73 is also hollow and communicates with the inside of shaft 72 by means of the side apertures 74, so that when the bottle-brush is rotating a current of water can be sent through the support 73, the shaft 72, and a tube 75, which extends upward between the blades 70 in order to facilitate the cleaning of the bottles.

The mechanism for rotating the bottle-brushes comprises for each row of the latter a pitman 76, pivoted to cranks 77, fixed on the lower ends of the shafts 72. The ends of the pitman 76 are jointed to sprocket-wheels 78 79, connected together by a sprocket-chain 80. The shaft 81 of the wheel 79 carries a bevel-pinion 82, which meshes with a bevel-wheel 83. On the shaft of the latter is fixed a spur-pinion 84, operated by spur-gearing, the last wheel 85 of which is operated, as hereinafter described, by a toothed rack 86, fixed to each of the beds 13.

At point IV are arranged ejectors, composed of vertical tubes 87, extending upward from horizontal tubes 88, into which a current of water under pressure can be sent by means of a cock 89. At the upper end of the tubes 87 is a nozzle 90, having lateral apertures.

For the purpose of causing the bottles to move downward onto the bottle-brushes and the ejectors of dirt I use the following means: On the circular rail 58 and in front of the points II and III are formed recesses having inclined faces 91 92, so that the roller 57, together with the rod 54, after having run over the level part of the rail 58, moves down into these recesses to a certain extent, which is sufficient to bring a bevel-pinion 93, carried by the spindle or rod 54, into engagement with bevel-teeth 94, formed on the wheel 50. The frame being at the same moment stopped by the fixed buffing parts 69, which are met by the heels 70 of the slides, the result is that pinion 93 is brought into engagement with the rotating wheel 94 and that the crank-plate 35 revolves, thus causing the bed 13 to move down and then move up. During the downward movement of the bed a finger 97, jointed to the lower part of a rod 98, fixed to the said bed, moves down underneath a roller 99, mounted on the stem 100 of the cam 61 and counterbalancing the latter, and during the following upward movement of the bed 13 the said finger 97 carries upward the roller 99, thus causing cam 61 to rock, as shown in dotted lines in Fig. 3. After the cam 61 has been thus rocked the roller 66 of the slide can ride suddenly up the face 68 under the action of springs 59, which pull the slide, so that the pin 52 is again brought into engagement with the teeth 51, and the rotary frame revolves another fourth of a revolution. At the beginning of this revolution the roller 57, together with the rod 54, rides up the face 92 and onto the level part of the rail 58 so that pinion 93 is disengaged from wheel 94. The crank-plate 95, having revolved right around once, can be arrested by means of a bolt, pawl, or other suitable stopping device (not shown) to prevent it from revolving when the pinion 93 is disengaged.

Figure 1:
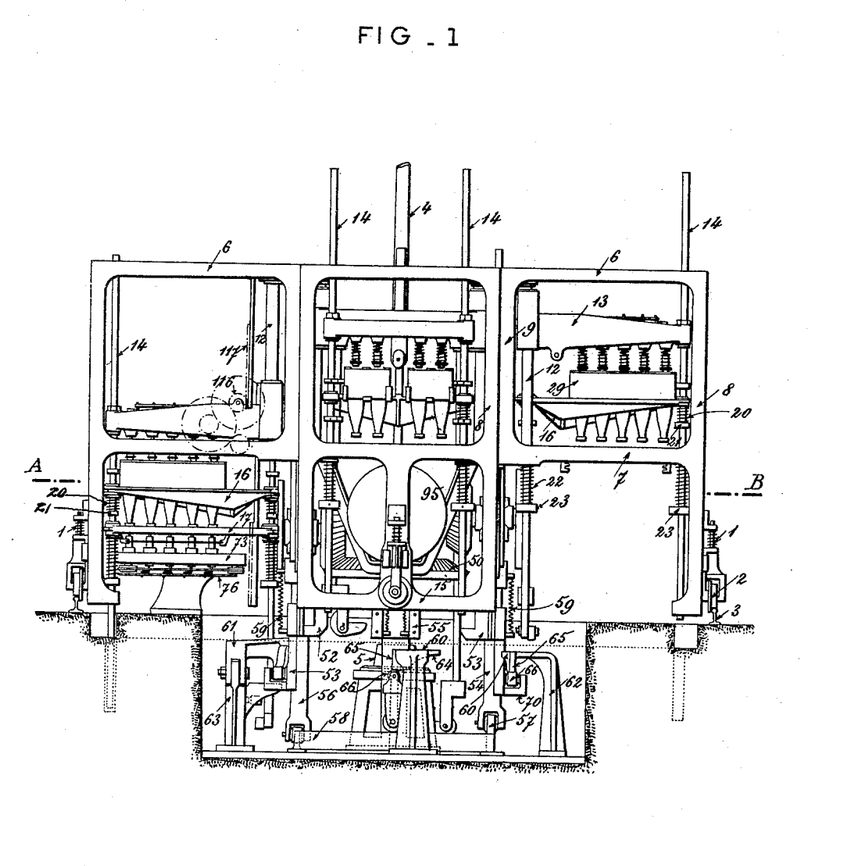
Figure 1 is an elevation of an apparatus comprising four compartments.

From the above description it will be easily understood that the bed 13 will be moved upward and downward at points II and III, while it will remain stationary when at points I and IV, where the rail 58 has not recess to allow of pinion 93 being engaged with wheel 94. At the two latter points the upturned cases 29 can therefore be easily inserted or withdrawn in sliding the same along the slideways 30 of framing 16. Each bed 13 is provided with devices for holding the bottles and causing the same to revolve on their axes during the upward and downward movements at points II and III. For that purpose buffers 101 are mounted on the shafts 102, journaled in the bed 13. The said buffers are slidable on the shafts 102, but revolve with the latter, to which they are connected by pins 103, engaging slideways 104. Each buffer is pressed downward by a spring 105. For each row of shafts 102 the cranks 106, fixed on the latter, are jointed to a pitman, the ends of which are pivoted to the sprocket-wheels 108 and 109, connected together by the sprocket-chain 110. The shaft 111 of sprocket-wheel 109 also carries a bevel-pinion 112, which meshes with a bevel-wheel 113, mounted on a shaft 114. The shaft 114, carried by the bed 13, carries a pinion 115, operated by a train of spur-wheels, the outer one, 116, of which is operated by a toothed rack 117, fixed to the frame. (See Fig. 1.) When the bed 13 moves down, the wheel 116 revolves along the toothed rack 117, thus causing the buffers 101 to revolve through the hereinbefore-described mechanism. It is the same when the bed 13 moves up; but then the rotation takes place in the opposite direction. During the first part of the downward movement of the bed and on account of the descent of the rod 54 into the recesses 91 92 of the rail 58 the buffers 101, which also move down, pass through the openings 36 of the pigeonhole-cases 29 and come against the bottom of the bottles in causing the springs 105 to give way. Then the rings 118, fixed on the rods 12 and 19, which coöperate with the bed 13, come against the framing 16 and cause the same to move down. Finally the necks of the bottles come into the movable cups 33 and cause the plate 17 to descend. The buffers 101 then cause the bottles to revolve. (See Figs. 8 to 11.) During the second part of the downward movement of the bed 13 and on account of pinion 93 having been brought into engagement with wheel 94 the bottles continue to revolve and move down onto the bottle-brushes and the dirt-ejectors until the latter nearly touch the bottom of the bottles. The bed 13 is afterward moved up by the pitman 96 of plate 95, and the bottles move upward with the bed until the framing 16 is again arrested by the buffing parts 25. During this movement the bottles continue to revolve, but in the opposite direction. Finally the bed 13 is again moved up to its initial or normal level through the medium of the rod 54, the roller 57 of which runs up the inclined face 92 of rail 58, after which the rotary frame is again made to revolve.

At point II the bottle-brushes are made to revolve when the bed 13 moves down, the toothed rack 86, fixed to the said bed, coming into mesh with the toothed wheel 85, and the said brushes are made to revolve in the opposite direction when the bed again moves up, the gearing being so arranged that the bottles and brushes always revolve in opposite directions.

The different parts of the apparatus having now been described, I will pass onto the operation of the same, which is as follows: During a stoppage of the rotary frame the pigeonhole-cases for the bottles are charged onto the framing 16, located at point I, and the corresponding cases located at point IV are discharged. During this time the pinions 93, located at points II and III, in engagement with wheel 94, cause the corresponding beds 13 to move down in bringing the bottles down onto the rotary brushes and onto the dirt-ejectors. Then the beds are moved up with the brushed and rinsed bottles, while the angular or forked parts 97, moving up with the beds, cause the cams 61 to rock in allowing the slides 53 at points II and III to ascend to bring at once the corresponding pins 52 into engagement with the teeth 51 of wheel 50, so that the rotary frame is again made to revolve. After a very short interval the slides at points I and IV are released in their turn from the fixed cams 60, and their pins 52 also come into engagement with the corresponding teeth 51. After one-quarter of a revolution the cams 60 and 61 act simultaneously on the slides 53 at the four points to disengage the pins 52 from the teeth 51 and to allow of the rotary frame to come to a stop, the slides 53 coming against the buffing parts 69 at points II and III. An operation similar to the previous one now begins, for in coming to a stop the rods 54 at points II and III have moved down into the recesses 91 92 and brought pinion 93 into engagement with wheel 94.

Figure 15:
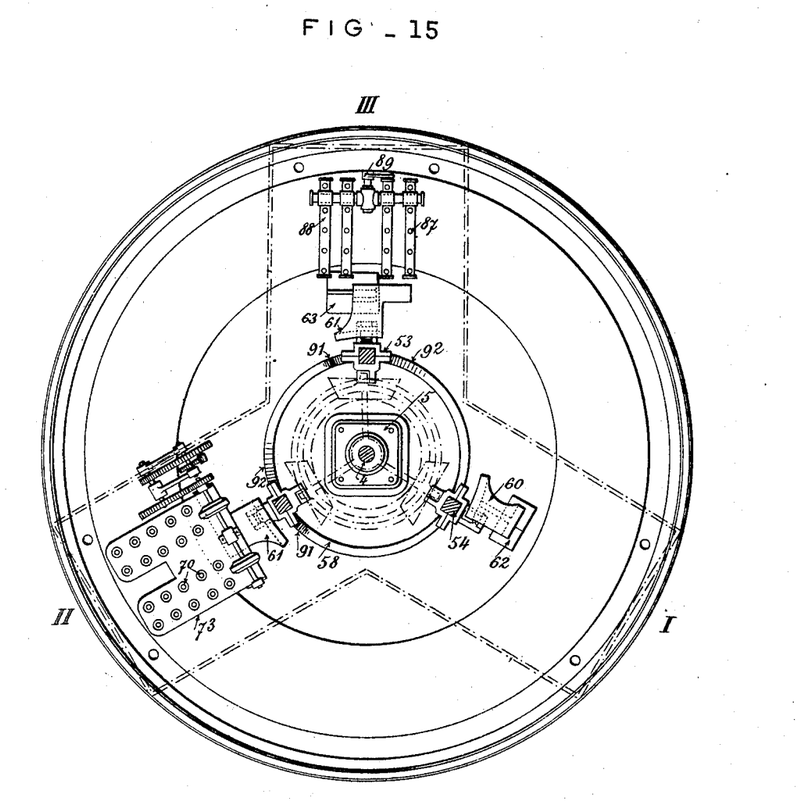
Fig. 15 is a plan view of a modified form of the apparatus which comprises only three compartments.

Fig. 15 shows a modified form of the bottle-rinsing rotary apparatus comprising only three stations I, II, and III, arranged one hundred and twenty degrees from each other. Station I serves for both charging and discharging the bottle-cases, stations II and III serving, respectively, for brushing and rinsing. The plant comprises exactly the same elements as the one hereinbefore described, save that one of the fixed cams 60 is done away with, as well as one of the similar elements of the rotary frame, together with the connected parts.

I claim—

1. An apparatus for rinsing bottles, comprising a rotary frame rotatable around a vertical shaft and comprising several compartments arranged at equal angles to receive the bottles, a series of bottle-brushes fitted up at a fixed point or station below the path of the bottles, a series of dirt-ejectors fitted up at a fixed point or station also below the path of the bottles, means to cause the rotary frame to revolve and to bring the compartments of the same to a stop above the said points where the said brushes and the said dirt-ejectors are stationed, and means to cause the bottles to move downward and upward around the said brushes and the said ejectors.

2. An apparatus for rinsing bottles, comprising a rotary frame provided with independently-movable beds supporting through the medium of springs framings to receive pigeonhole-cases for the bottles and plates provided with apertures for holding the bottles, means to cause the said rotary frame to revolve intermittently by connecting the same with and disconnecting the same from a central driving-wheel, means for causing the beds to move downward and upward in their turn together with the said framings, cases, and plates, and series of vertical bottle-brushes and tubes ejecting water under pressure arranged at fixed points so that the bottles will move down onto the said brushes and the said tubes.

3. In an apparatus for rinsing bottles having a rotary frame rotatable around a vertical shaft, the combination of a bed vertically movable in the said frame and serving to hold the bottles, of a crank-plate mounted on a rod vertically movable in the frame and resting on a circular path, of a pitman connecting the said bed with the crank-plate; of a bevel-pinion coöperating with the said crank-plate, of the circular path in which recesses are formed, and of a central driving-wheel with which the said pinion meshes when the said rod rests in a recess of the circular path.

4. In an apparatus for rinsing bottles having a rotary frame rotatable around a vertical shaft, the combination of vertical rods mounted in the said frame, of slides movable on the said rods and provided with operating-pins, of a central driving-wheel, of springs to bring the said slides into movement with the said driving-wheel to cause the said rotary frame to revolve, of fixed cams and of oscillating cams arranged at fixed points to so act on the said slides as to put them out of gear with the driving-wheel, of fixed buffing parts arresting the rotary motion of the slides when the latter are displaced by the said cams, and of means of causing the oscillating cams to rock in order to allow of the corresponding slides again coming into gear with the driving-wheel.

5. In an apparatus for rinsing bottles having a rotary frame rotatable around a vertical shaft, the combination of a bed vertically movable in the said frame, supporting through the medium of springs a framing to receive the bottle-cases and a plate provided with apertures for holding the bottles, of a series of spring-buffers carried by the bed above the bottles, of a crank-and-gear mechanism to cause the said buffers to revolve together with the bottles, and of a fixed toothed rack fixed to the said rotary frame and meshing with one of the wheels of the said gear to operate the said mechanism when the bed moves upward and downward.

In testimony that I claim the foregoing as my invention I have signed my name in presence of two subscribing witnesses.

GEORGES HEURTEAUX.

Witnesses:
EUGÈNE WATTIER,
EDWARD P. MACLEAN.